United States Patent [19]

Van Ochten

[11] Patent Number: 5,507,688

[45] Date of Patent: Apr. 16, 1996

[54] METHOD AND DEVICE FOR SEPARATING THE SKULL AND THE VERTEBRAL COLUMN OF A SLAUGHTERED ANIMAL

[75] Inventor: Sander A. Van Ochten, Lichtenvoorde, Netherlands

[73] Assignee: Stork R.M.S. B.V., Netherlands

[21] Appl. No.: 279,238

[22] Filed: Jul. 22, 1994

[30] Foreign Application Priority Data

Jul. 23, 1993 [NL] Netherlands ............................ 9301306

[51] Int. Cl.⁶ ....................................................... A22B 5/00
[52] U.S. Cl. ............................................. 452/64; 452/167
[58] Field of Search ............................. 452/64, 66, 108, 452/167

[56] References Cited

U.S. PATENT DOCUMENTS

| | | | |
|---|---|---|---|
| 4,962,568 | 10/1990 | Rudy et al. | 452/157 |
| 5,083,971 | 1/1992 | Karubian et al. | 452/64 |
| 5,152,713 | 10/1992 | Baertlein | 452/64 |
| 5,162,016 | 11/1992 | Malloy | 452/157 |
| 5,192,243 | 3/1993 | Weustink | 452/157 |

FOREIGN PATENT DOCUMENTS

| | | | |
|---|---|---|---|
| 22723/88 | 4/1989 | Australia | A22B 7/00 |
| 0212580 | 3/1987 | European Pat. Off. | A22B 5/20 |
| 0508550 | 10/1992 | European Pat. Off. | A22B 5/00 |
| 3529205 | 2/1987 | Germany | 452/167 |

*Primary Examiner*—Willis Little
*Attorney, Agent, or Firm*—Webb Ziesenheim Bruening Logsdon Orkin & Hanson

[57] ABSTRACT

The invention relates to a method for processing the neck of a slaughtered animal such that the skull is separated from the vertebral column, which method comprises the steps of:

(1) positioning a slaughtered animal for processing;

(2) providing a separating device, for instance a hydraulically or pneumatically energized pair of scissors, to arrange a separation in the cervical vertebral column, for instance between the skull and the first cervical vertebra;

(3) determining the location where the separation must take place; and (4) positioning the separating device and activating same on the basis of the result of step (3) in order to arrange the separation.

19 Claims, 2 Drawing Sheets

5,507,688

METHOD AND DEVICE FOR SEPARATING THE SKULL AND THE VERTEBRAL COLUMN OF A SLAUGHTERED ANIMAL

BACKGROUND OF THE INVENTION

The invention relates to methods for processing the neck of a slaughtered animal such that the skull is separated from the vertebral column. In general, these methods include the steps of:

(1) positioning a slaughtered animal for processing;

(2) providing a separating device, for instance a hydraulically or pneumatically energized pair of scissors, to arrange a separation in the cervical vertebral column, for instance between the skull and the first cervical vertebra;

(3) determining the location where the separation must take place; and (4) positioning the separating device and activating same on the basis of the result of step (3) in order to arrange the separation.

The invention also relates to devices for performing methods such as those set forth above for processing the neck of a slaughtered animal such that a separation is arranged in the vertebral column. These devices include:

positioning means for positioning a slaughtered animal for processing; and a separating device, for instance a hydraulically or pneumatically energized pair of scissors, for arranging a separation in the cervical vertebral column, for instance between the skull and the first cervical vertebra.

Similar methods and devices are known. Usual is substantially vertical positioning of the animal, for instance suspended from the hind legs. Using a hydraulically or pneumatically energized scissor tool the neck of the animal, for instance a pig, is cut through manually by an operator. The known processing methods have the drawback of being none too accurate. It can occur that due to the separating operation bone splinters are separated from the locally present bones, which is undesired. Loss of usable meat can also occur due to the inaccuracy of the cutting operation.

The separating operation takes place in the vertebral column, for example in the region between the occipital protuberances and the atlas, or further to the rear in the direction of the tail.

An object of the invention is to automate the operations performed manually up to the present, whereby laboursaving and an improved operating precision are obtained.

A further object of the invention is to perform the separating operation such that the occurrence of bone splinters is effectively prevented, while the danger of usable meat being lost is also considerably reduced.

SUMMARY OF THE INVENTION

The method according to the invention includes the step of determining the location where the separation must take place such that the desired separating position is determined by means of a measuring device, for instance by measuring at least one point of the rear surface of the skull. This can be in particular the position of the rear surface of the skull. The rear surface is not always flat but has different shapes depending on the type of animal. The separating device can for instance be adapted to follow the shape of this rear surface. It is noted that a separation between cervical vertebrae can also take place.

The device according to the invention includes a measuring device, for instance for measuring at least one point of the rear surface of the skull, for determining the desired separating position, for example the transition between the skull and the first cervical vertebra, and a positioning device which is coupled to the separating device and which, under the control of the measuring device, can position the separating device such that when activated the latter arranges said separation.

The measurement of the position of the transition between the skull and the first cervical vertebra can take place in diverse ways. Use can for instance be made of a video camera having signal processing means coupled thereto. The camera determines for example the position of the ears, while the signal processing means processing the video signals determine the cutting position, for instance partly on the basis of a statistical correction, wherein between the implant of the ears and the cutting position a distance of for instance about 50 mm is chosen. The drawback to cameras with the associated electronic processing is that they are expensive and vulnerable and operate less accurately. A mechanical scanning to determine the position of the ears and/or the tip of the nose is also possible. The separating position is derived from the result of this scan.

A direct rather than an indirect measurement is therefore recommended according to the invention. This can particularly take the form of a hard detection. A device utilizing this principle has the feature that the measuring device comprises a pointed pin which can be placed through the soft tissue to come into contact with the rear surface of the skull oriented toward the vertebral column.

A further development of this principle is embodied in a device having the feature that the measuring device comprises a second pointed pin which can be placed through the soft tissue to come into contact with the rear surface of the skull oriented toward the vertebral column, which second pin is placed at a distance from the first pin such that the measuring device can also determine the angle at which the rear surface of the skull extends for corresponding control of the positioning device coupled to the separating device.

A device of the above described type operating with at least one pin preferably has means for retracting the pin(s) prior to activating of the separating device.

Insertion of the pin or pins into the animal can result in a certain change in position or wobbling, which can make the separating operation difficult. In this respect the device preferably has the feature that the positioning means comprise a support which prevents movement of an animal under the influence of the pin(s).

It has been found in practice that the use of one pin usually provides a sufficiently high precision of the separating operation. This is even the case when the separation takes place along the rear surface of the skull. For successive slaughtering of animals of one particular category the position of this surface will generally be the same within the set tolerance limits.

The use of two pins can have the advantage that herewith a positive indication is obtained as to the spatial position of the rear surface. This may contribute to the accuracy of the separating operation.

It is possibly advantageous if the at least one pin extends at least roughly in the plane of symmetry of the animal.

A particular variant has the special feature that the separating means also serve as support. As an example hereof reference can be made to the use of a pair of scissors which is placed by a limited energizing against the relevant zone of the neck of the animal, whereby swivelling is prevented. After the desired cutting position has been determined, a definitive positioning of the scissors optionally takes place followed by energizing to perform the separating operation.

In addition to the above mentioned principles of video detection and direct hard detection, the measuring device can also be based on ultrasonically operating means or on means based on X-rays.

With regard to the separating operation it is noted that use is usually made of an energized scissor tool. Other suitable separating means can also be considered such as cutting, sawing, the use of a rotary knife, a vibrating knife, and infrared laser etc.

In a variant the device has the feature that the separating device comprises an endless drivable wire. Such a wire, which in its active part has a sufficiently high tensile stress, has the advantage of cutting easily through relatively soft tissue but not cutting through bone.

One variant has the special feature that the wire also forms part of the measuring device. Use can herein be made of the above stated property, that the wire can only cut through relatively soft portions.

BRIEF DESCRIPTION OF THE DRAWINGS

The invention will now be further elucidated with reference to the annexed drawings. Herein.

DESCRIPTION OF THE PREFERRED EMBODIMENTS

Figure 1:
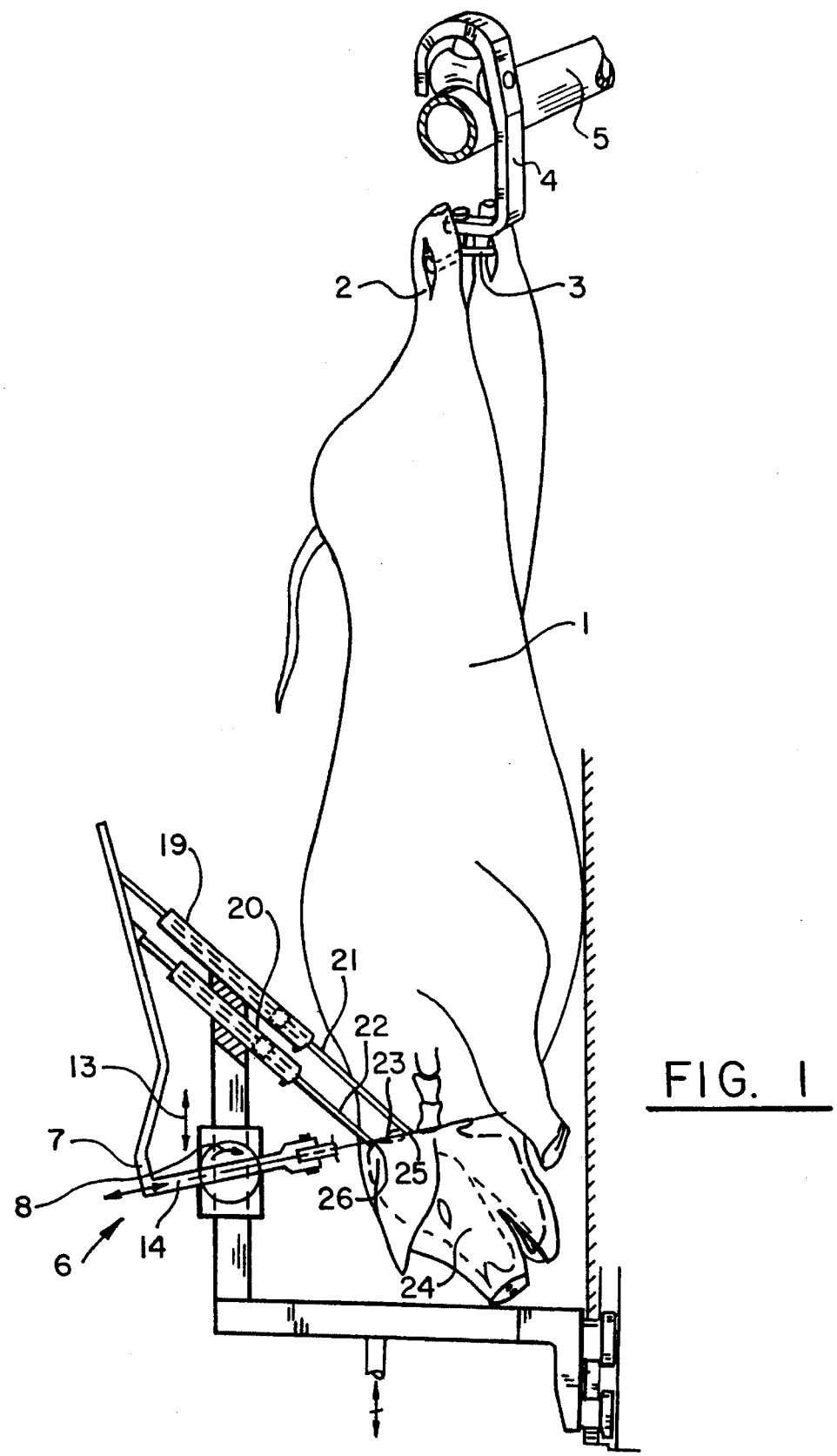
FIG. 1 shows partly in side view, partly in section a separating device according to the invention during processing of a slaughtered pig.

FIG. 1 shows a pig 1 which is suspended from its hind legs 2 by means of hooks 3. These hooks are displaceable over a rail 5 by means of a suspension bracket 4. In this manner the pig 1 is positioned relative to a measuring and separating device 6. This comprises a frame 7 (see also the detail drawing in FIG. 2), the angular position of which is adjustable as according to arrow 8 by rotation round the rotation axis of rotation bearings 9, 10. The frame is vertically displaceable along pillars 11, 12 as according to arrow 13. The longitudinal position of the lower arm 14 of frame 7 is adjustable. This arm supports two blades 16, 17 which are driven by a pneumatic cylinder 15 and which can swing relative to arm 14 by means of a hinge 18 and which together form a pair of scissors 16, 17, 18.

The frame 17 carries two obliquely disposed pneumatic cylinders 19, 20. The associated respective piston rods 21, 22 are embodied as pointed pins which can be inserted through the soft tissue of the neck of the pig 1 to be subsequently blocked against further movement by the rear surface 23 of the skull 24. FIG. 1 in particular shows the actual shape of this rear surface. Clearly shown are the so-called occipital protuberances which, in some animals, particularly sheep, are more pronounced. The pointed ends 25, 26 of piston rods 21, 22 lie roughly in the median plane of the pig and the effective cutting plane of scissors 16, 17, 18 extends substantially through the connecting line of the ends 25, 26. It will be apparent that this ensures that the cutting action takes place in this plane in which the attachment between the skull and the first cervical vertebra is situated. The intended separation therefore takes place in this plane.

It will be apparent that the position and spatial orientation of the rear surface 23 are determined through the use of the two pins.

Figure 2:
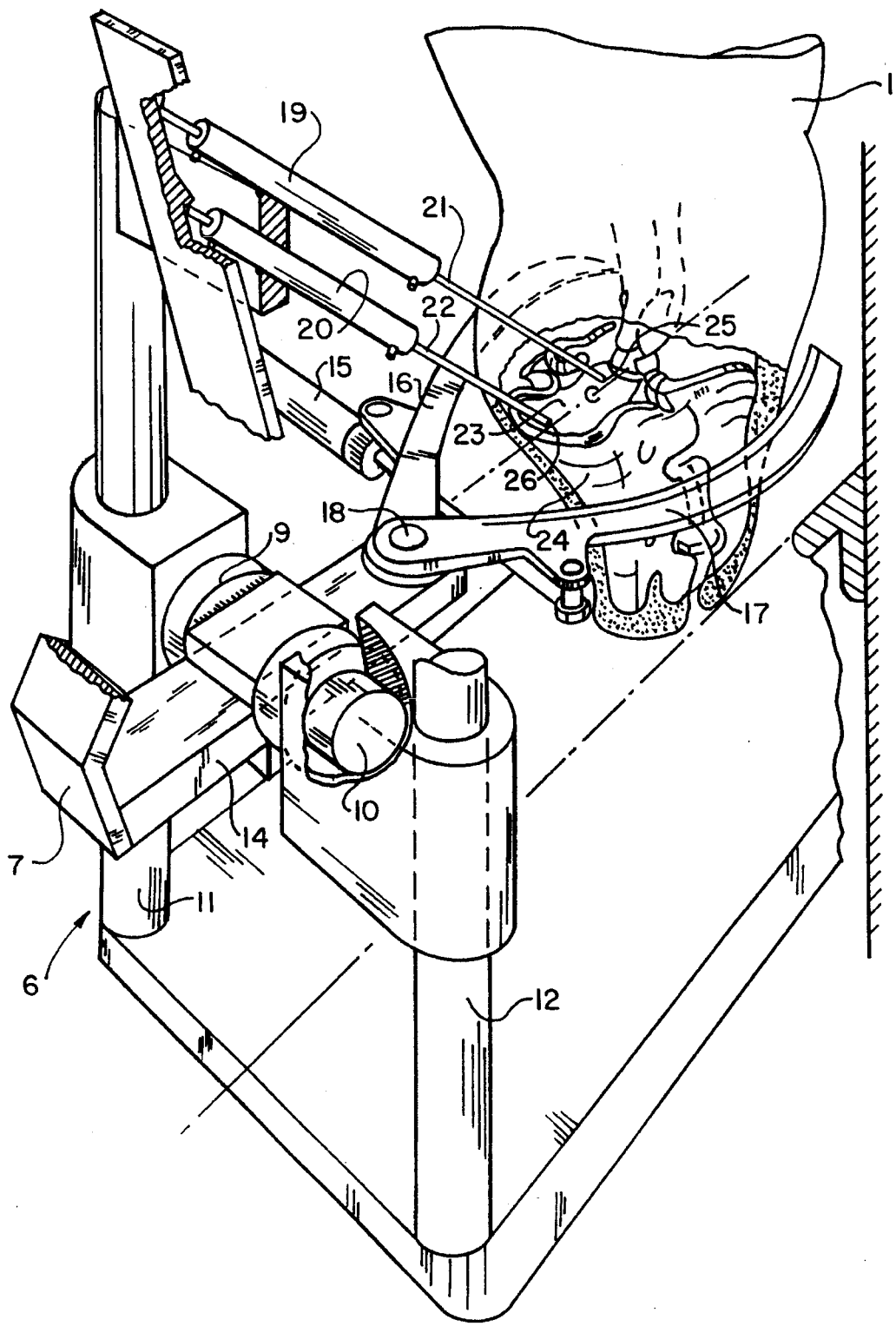
FIG. 2 shows a partly broken away perspective view of the device of FIG. 1 on enlarged scale.

Once the desired position of the scissors 16, 17, 18 has been determined in relation to the surface 23, the piston rods 21, 22 can be retracted at least over some distance by relevant energizing of cylinders 19, 20, whereby the action of scissors 16, 17 is not impeded. Displacing of the blades 16, 17 toward each other takes place by appropriate energizing of cylinder 15. The housing of cylinder 15 is hingedly connected to the blade 16 in the manner shown in FIG. 2, while the piston rod of cylinder 15 is hingedly connected to arm 17. In this embodiment the cylinder 15 can be freely positioned in space, that is, the free end not visible in FIG. 2 is not connected to any part of the device.

What is claimed is:

1. A method for processing the neck of a slaughtered animal such that the skull is separated from the vertebral column, comprising the steps of:

(1) positioning a slaughtered animal for processing;

(2) providing a separating device to arrange a separation in the cervical vertebral column;

(3) determining the location where the separation must take place by means of a measuring device which locates at least one point on the rear surface of the skull; and (4) positioning the separating device and activating same on the basis of the result of step (3) in order to arrange the separation.

2. A device for processing the neck of a slaughtered animal such that a separation is arranged in the vertebral column, comprising:

positioning means for positioning a slaughtered animal for processing;

a separating device for arranging a separation in the cervical vertebral column;

a measuring device for locating at least one point of the rear surface of the skull and for thus determining the desired separating position; and a positioning device coupled to the separating device and which, under the control of the measuring device, can position the separating device such that when activated the latter arranges said separation.

3. A device as claimed in claim 2, wherein the measuring device includes a first pointed pin which can be placed through the soft tissue to come into contact with the rear surface of the skull oriented toward the vertebral column.

4. A device as claimed in claim 3, wherein the measuring device further includes a second pointed pin which can be placed through the soft tissue to come into contact with the rear surface of the skull oriented toward the vertebral column, which second pin is placed at a distance from the first pin such that the measuring device can also determine the angle at which the rear surface of the skull extends for corresponding control of the positioning device coupled to the separating device.

5. A device as claimed in claim 3, further including means for retracting the first pin prior to activating of the separating device.

6. A device as claimed in claim 3, wherein the positioning means comprise a support which prevents movement of an animal under the influence of the first pin.

7. A device as claimed in claim 6, wherein the separating means also serve as support.

8. A device as claimed in claim 2, wherein the measuring device comprises ultrasonically operating means.

9. A device as claimed in claim 2, wherein the measuring device comprises X-ray means.

10. A device as claimed in claim 2, wherein the separating device comprises an endless drivable wire.

11. A device as claimed in claim 10, wherein the wire also forms part of the measuring device.

12. A method as claimed in claim 1, wherein said separating device includes a hydraulically energized pair of scissors.

13. A method as claimed in claim 1, wherein said separating device includes a pneumatically energized pair of scissors.

14. A method as claimed in claim 1, wherein said separation occurs between the skull and the first cervical vertebra.

15. A device as claimed in claim 4, further including means for retracting the first and second pins prior to activating of the separating device.

16. A device as claimed in claim 4, wherein the positioning means comprise a support to prevent movement of the animal caused by the first and second pins.

17. A device as claimed in claim 2, wherein the separating device includes a hydraulically energized pair of scissors.

18. A device as claimed in claim 2, wherein the separating device includes a pneumatically energized pair of scissors.

19. A device for processing the neck of a slaughtered animal, comprising:

means for positioning a slaughtered animal for processing;

means for arranging a separation in the cervical vertebral column;

means for determining the location where the separation must take place by locating at least one point on the rear surface of the skull; and means for positioning and activating a separation device.

* * * * *